March 19, 1940.

C. E. QUICK 2,194,074

POPCORN MACHINE

Filed Sept. 26, 1938

Inventor:
Claude E. Quick
By: A. Trevor Jones
Atty.

March 19, 1940.　　　C. E. QUICK　　　2,194,074
POPCORN MACHINE
Filed Sept. 26, 1938　　　7 Sheets-Sheet 2

Inventor:
Claude E. Quick
By: A. Trevor Jones
Atty.

March 19, 1940.   C. E. QUICK   2,194,074
POPCORN MACHINE
Filed Sept. 26, 1938   7 Sheets-Sheet 3

Inventor:
Claude E. Quick
By: A. Trevor Jones
Atty.

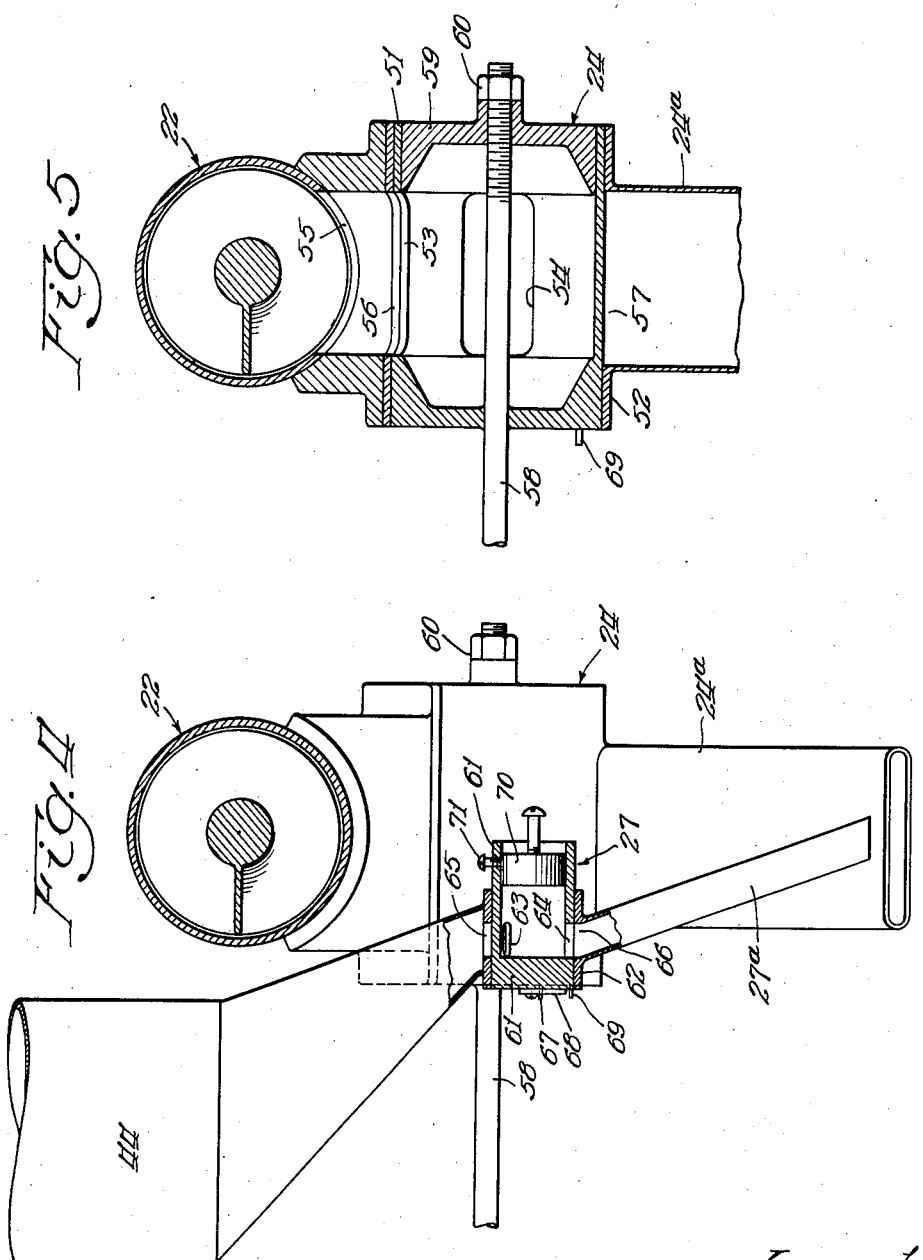

March 19, 1940.    C. E. QUICK    2,194,074
POPCORN MACHINE
Filed Sept. 26, 1938    7 Sheets-Sheet 5
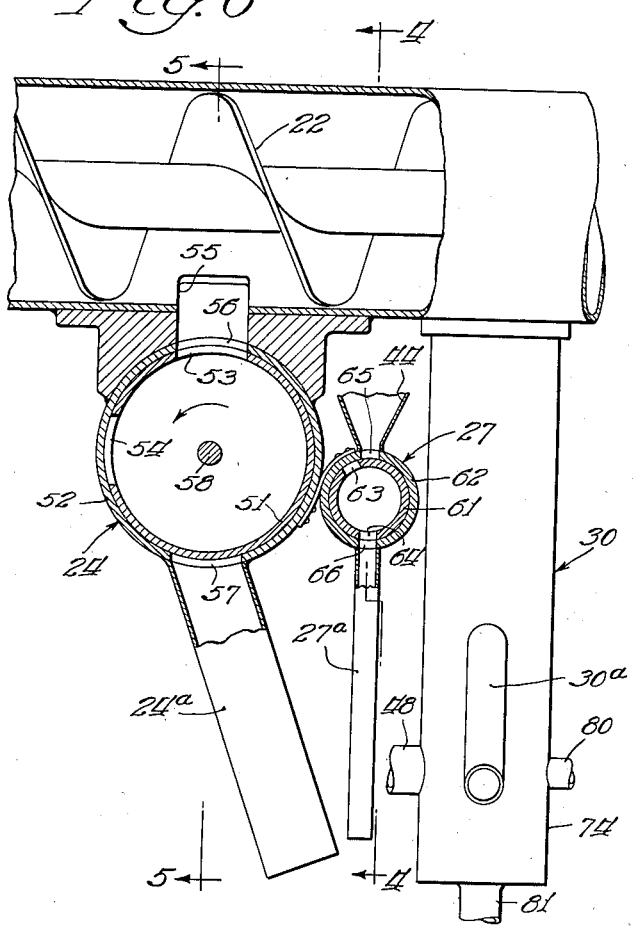
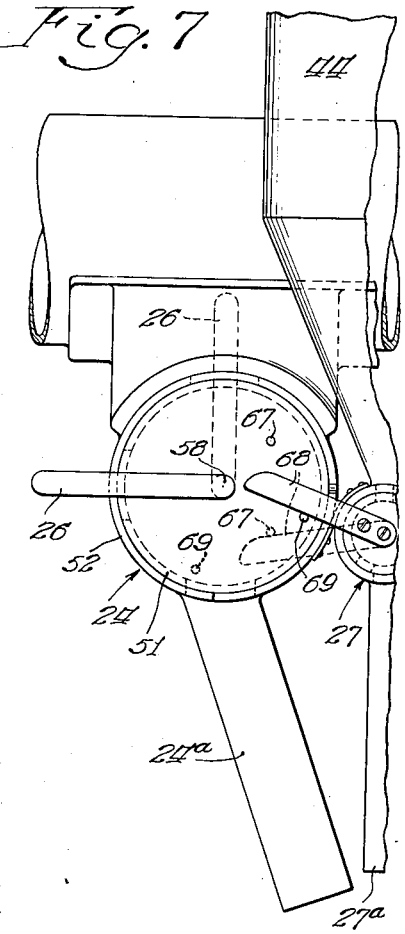
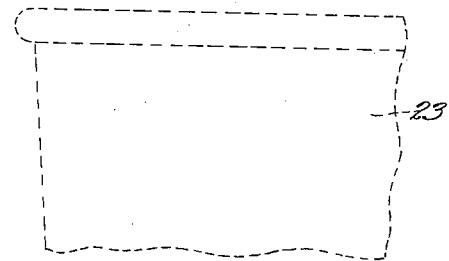
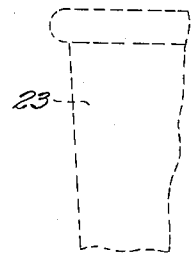
Inventor:
Claude E. Quick
By: A. Trevor Jones
Atty.

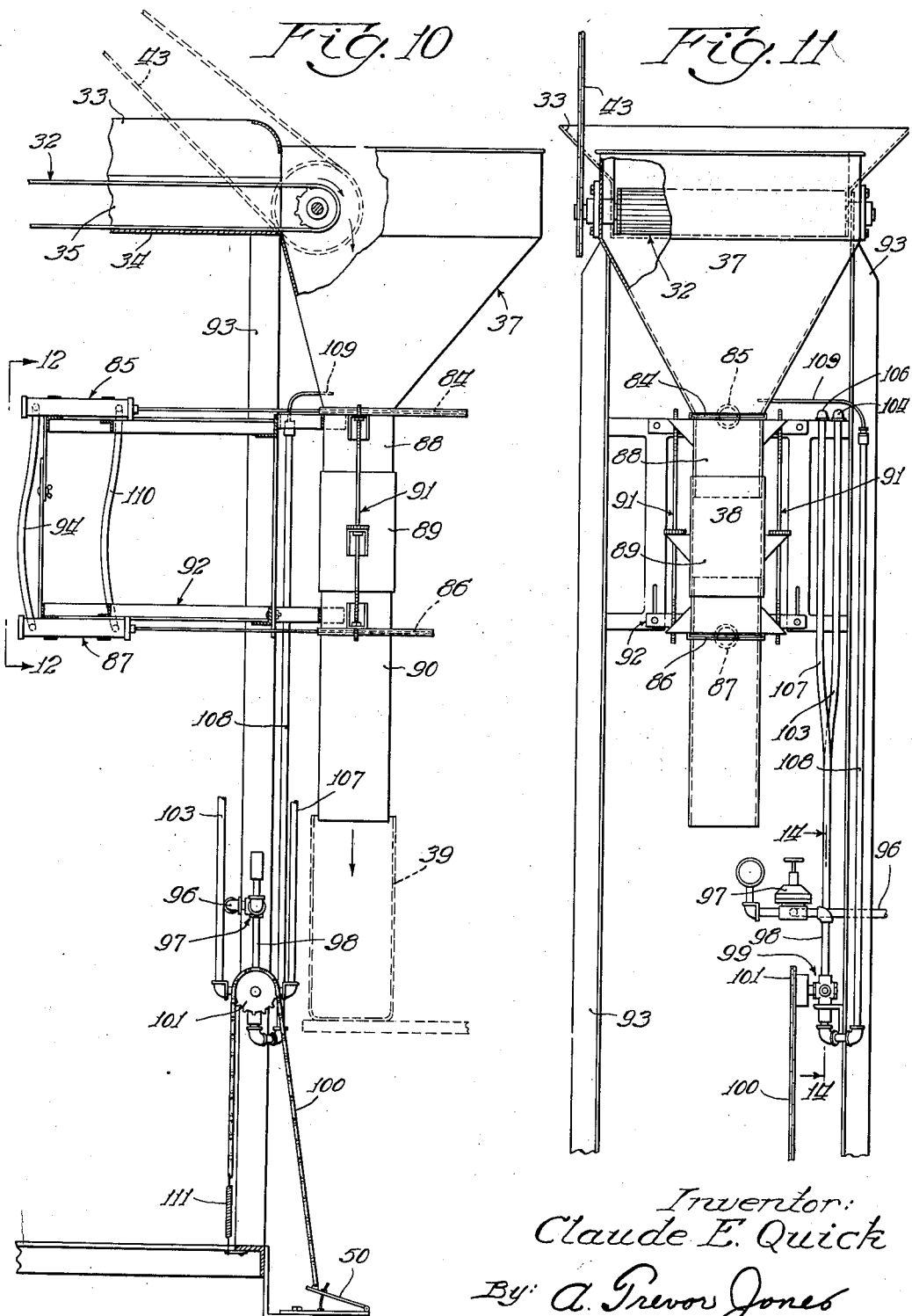

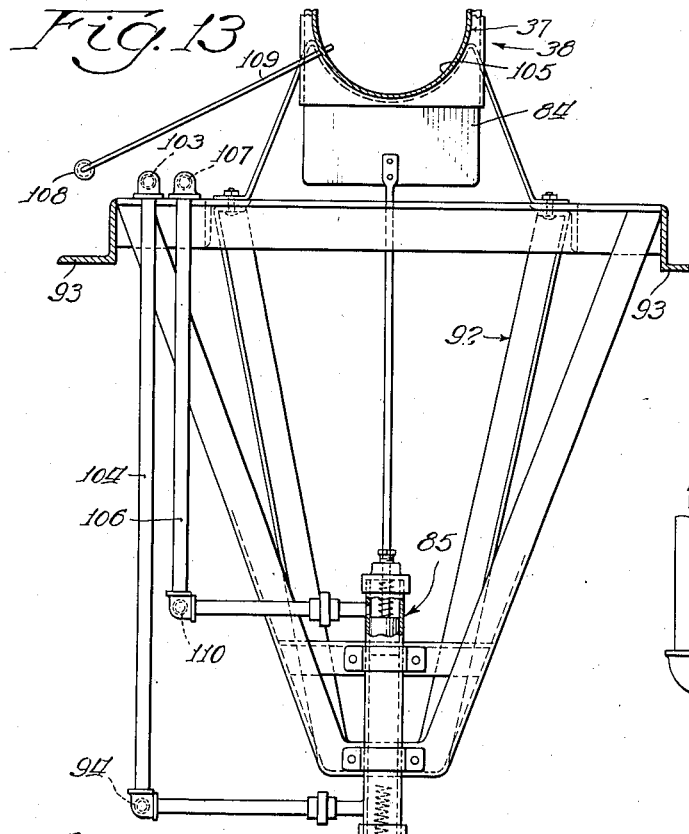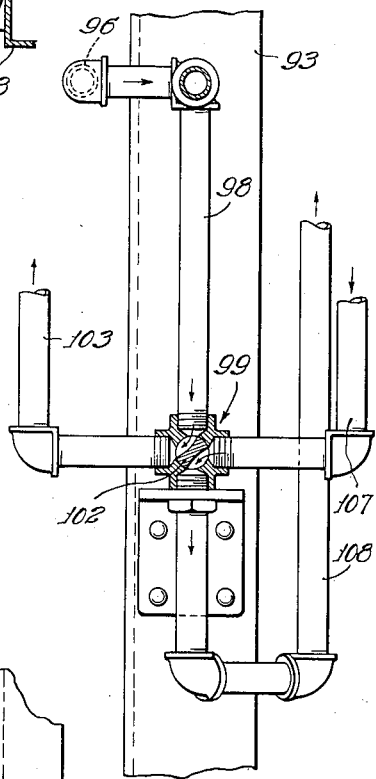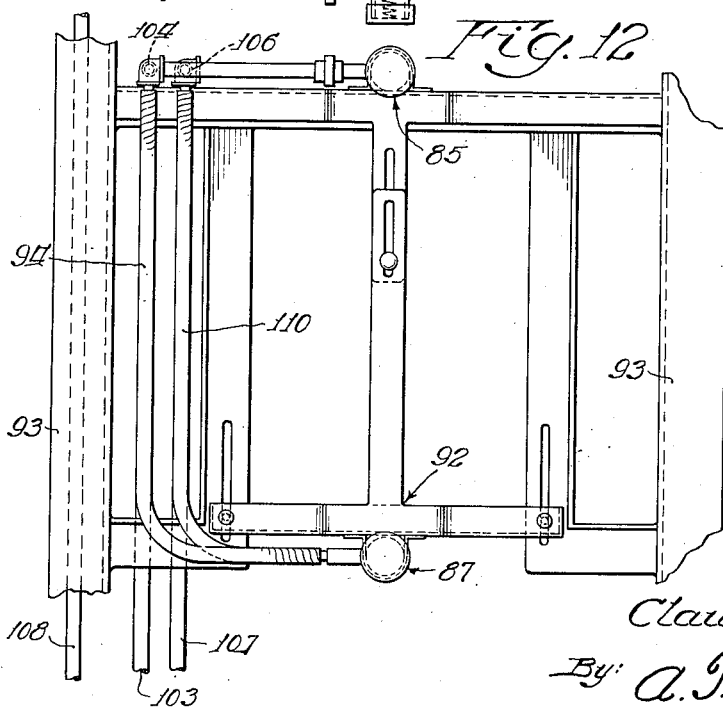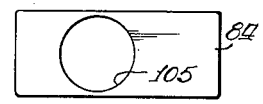

Patented Mar. 19, 1940

2,194,074

UNITED STATES PATENT OFFICE 2,194,074

POPCORN MACHINE

Claude E. Quick, Glendale, Calif., assignor to Interstate Bakeries Corporation, Kansas City, Mo., a corporation of Delaware Application September 26, 1938, Serial No. 231,695

14 Claims. (Cl. 53—4)

This invention relates to the production of popped popcorn or the like, and provides improved means and method more particularly for large scale production of such product.

Among other objects the invention aims to provide automatic or partially automatic machinery which eliminates the necessity for any human hands to touch the products from the time the raw material or unpopped kernels are deposited in the material bin until the popped popcorn has been packed in bags or other containers for delivery and sale.

Other objects and advantages will be apparent from the following description taken together with the accompanying drawings, in which—

Figure 4 is a fragmentary view similar to Fig. 3 with the part shown in section and on a larger scale, and being a section taken on the line 4—4 of Fig. 6;

Figure 5 is a further fragmentary view similar to Fig. 4 but with parts omitted and other parts shown in section, and being a section taken on the line 5—5 of Fig. 6;

Figure 6 is a partial longitudinal section taken on the line 6—6 of Fig. 3, somewhat enlarged;

Figure 7 is a view somewhat similar to Fig. 6 but in elevation instead of in section, and showing the parts in alternative position in full lines, the dotted lines in Fig. 7 showing the parts in the position shown in Fig. 6;

Figure 8 is a partial elevational view taken on the line 8—8 of Fig. 3;

Figure 9 is a fragmentary vertical section taken on the line 9—9 of Fig. 3;

Figure 10 is a partial enlarged side elevational view on the left hand end of the machine as shown in Fig. 1 but looking at these parts from the rear of Fig. 1;

Figure 11 is an elevational view looking at the right hand end of Fig. 10, parts shown in Fig. 10 however being omitted;

Figure 1:
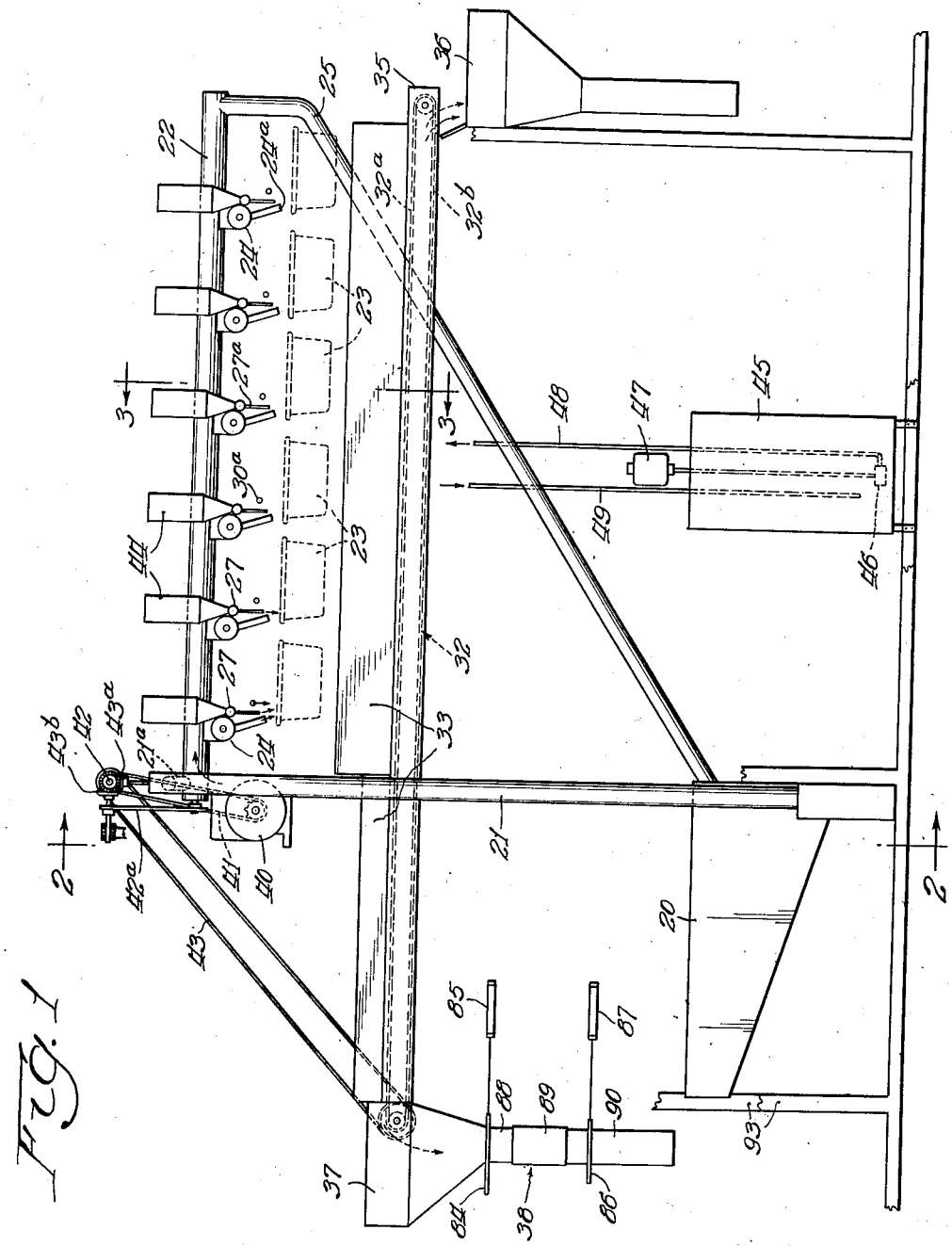
Figure 1 is a somewhat schematic view showing a side elevation of the machine.

Figures 10a and 10b respectively are detail plan views of the gates for the package filling mechanism;

Figure 12 is a fragmentary elevational view looking at the right hand end of parts shown in Fig. 10 and being a view taken on the line 12—12 of Fig. 10, somewhat enlarged;

Figure 13 is a plan view of the structure of Fig. 12, parts being shown in section and being a view taken on the line 13—13 of Fig. 12; and Figure 14 is a fragmentary elevational view partially in section taken on the line 14—14 of Fig. 11 on a larger scale.

Referring in detail to the illustrative construction shown in the drawings, a supply of unpopped popcorn kernels is deposited in the supply bin 20 from which they are elevated by the vertical tubular screw conveyor 21 through a chute 21a, to a header 22 which is also in the form of a tubular screw conveyor running horizontally, of and above the individual heater pots 23. It will be understood that each of these heater pots may be individually heated by electrical heating elements of conventional commercial design and not here necessary to be described. For each of the heater pots 23 there is a kernel-measuring receptacle 24 and when all of these kernel-measuring receptacles 24 are filled the excess raw material passes back to the supply bin 20 through the chute 25.

Figure 3:
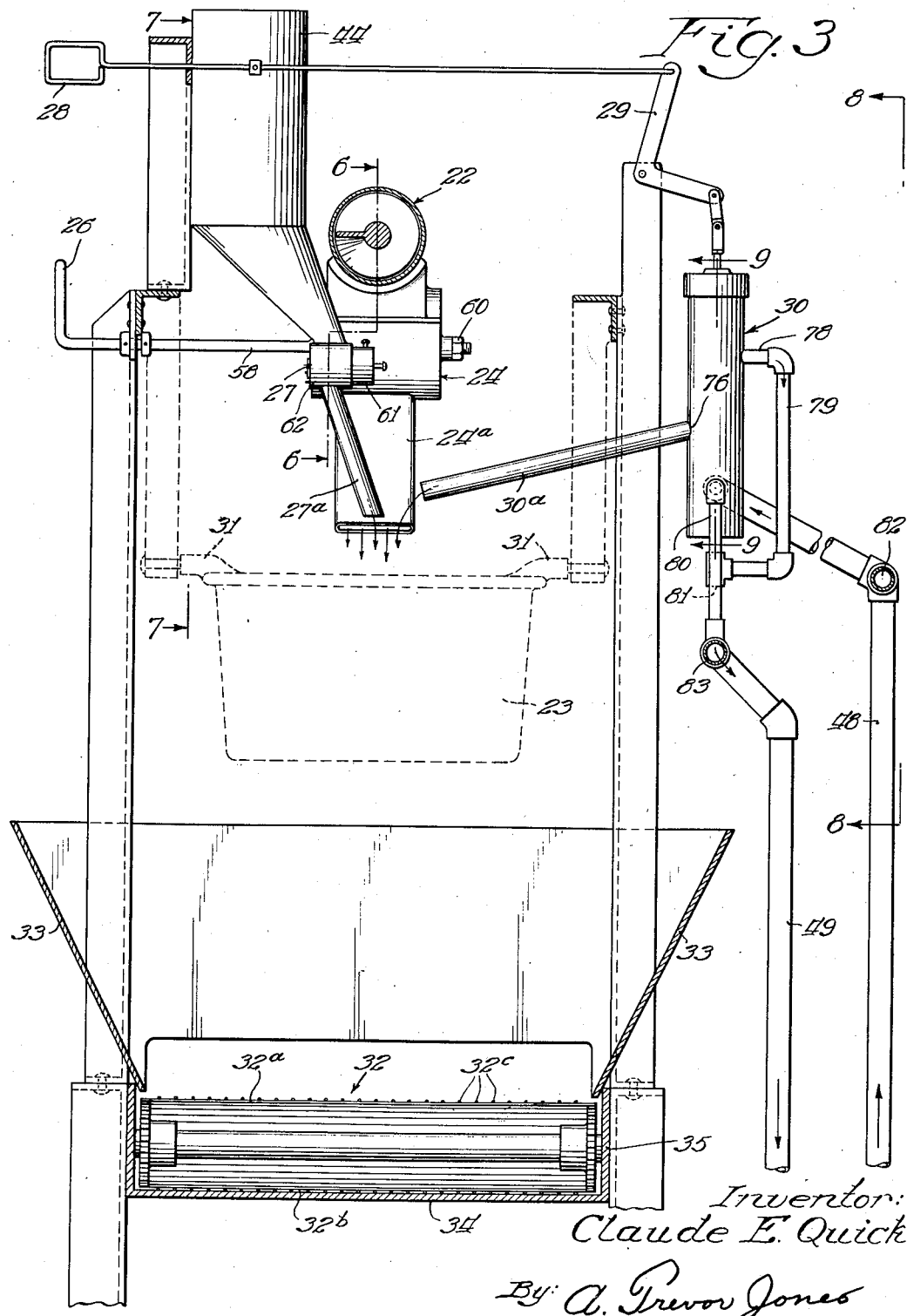
Figure 3 is an enlarged partial vertical section taken on the line 3—3 of Fig. 1, looking toward the left.

When the individual measuring receptacles 24 each for an individual heater pot 23 has been filled with unpopped kernels, one or more of these kernel-measuring receptacles may be emptied through the spout 24a into its respective heater pot 23, in this instance by manual means including the handle 26 for each kernel-measuring receptacle, and by manipulation of this handle an auxiliary measuring receptacle 27 for salt, is automatically filled, by means later described. When now the handle 26 is moved in the reverse direction to close the measuring receptacle 24, the contents of the salt-measuring receptacle 27 are at the same time automatically emptied through the spout 27a into the heater pot. Then by manipulation of the lever 28 and the bell crank 29 a suitable quantity of oil such as butter oil or the like, is emptied from the oil-measuring receptacle 30 through the spout 30a (Fig. 3) into the heater pot, the oil thus seeping down through the portion of the kernel supply received in that particular heater pot and carrying with it the salt which has been also deposited therein on top of the kernels, the mass thus being permeated by the salt and oil. Thereupon the heater pot is electrically heated as already referred to, to pop the kernels. When the contents of an individual heater pot has been suitably heated as may be determined by the skill of the operator or by other means not necessary to be here described, the heater pot may be turned upside down on its trunnions 31 to empty the popped corn onto the upper run 32a of the wire conveyor belt 32 which has the side guards 33 therefor forming a trough extending the length of the row of heater pots 23. The wires of this wire conveyor are so spaced apart that any unpopped kernels and broken pieces of corn which are smaller than the popped corn will drop through onto the floor 34 of the conveyor channel 35 from which they are swept by movement of the lower run 32b of the conveyor in a reverse direction to empty them into the discard funnel 36. Desirably, a series of parallel runs of piano wire or the like 32c are strung about one-half inch apart longitudinally about the wire conveyor 32 and movable therewith. This prevents the larger kernels from working through the conveyor.

Figure 2:
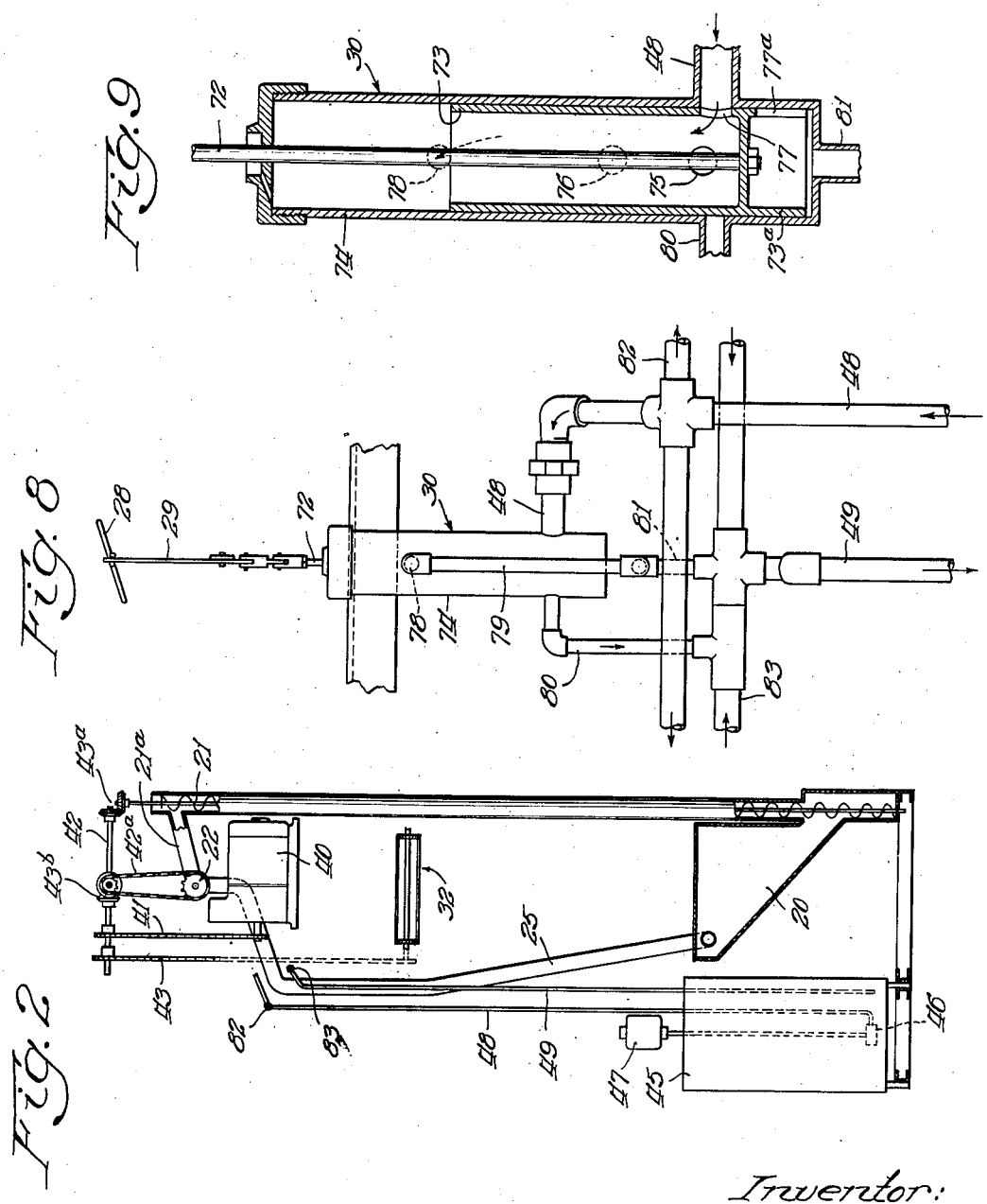
Figure 2 is a vertical section or somewhat end view taken on the line 2—2 of Fig. 1, looking toward the right.

The popped corn is carried by the upper run of the conveyor belt 32 to the delivery hopper 37 from which by a measuring device 38 a suitable quantity may be deposited within the bag 39 (Fig. 10) which may then be wrapped for sale. The screw conveyors 21 and 22 and the wire belt 32 may be operated as shown in Fig. 2 by a motor speed reducer 40 having a chain drive 41 to the countershaft 42 which drives the conveyor belt 32 by another chain drive 43, and by suitable gears 43a meshes with the shaft of the screw conveyor 21, and by suitable gears 43b chain 42a drives the screw conveyor 22. A sprocket reduction assembly for the chain 42a causes the conveyor 22 to run at slower speed than conveyor 21.

The salt supply may be manually replenished by being deposited in the salt storage containers 44 which communicate with the salt-measuring receptacles 27 for each heater pot.

The oil supply may be contained in a storage tank 45 which by means of a pump 46 operated by a motor 47 the oil supply may be circulated through a system of pipes including the pipes 48 and 49 (Fig. 3) to the oil-measuring receptacle 30 with the overflow thereof returning to the tank 45.

The package-measuring device may be operated by a foot pedal 50 (Fig. 10) by the compressed air mechanism shown in Figs. 10 to 14 inclusive, as will presently be more fully described.

It will be understood that the various mechanisms and structures referred to may be suitably supported by a framework or standards which as an entirety may be mounted on rollers to be moved from one part of a bakery or candy manufacturing shop or the like, where such operations may suitably be carried on.

I will now describe in more detail the kernel-measuring device 24 and its operation. As best shown in Fig. 6 this is in the form of an inner cylinder 51 and outer cylinder 52 within which the inner cylinder snugly is manually rotated by means of the handle 26. The inner cylinder has two ports angularly spaced apart, 53 and 54. In the position of the inner cylinder as shown in Fig. 6 the port 53 (Fig. 6, and as shown in dotted lines in Fig. 7) is open to the horizontal conveyor 22 by communication with the orifice 55. The outer cylinder 52 has an opening 56 communicating with the orifices 55 and another opening 57 communicating with the delivery spout 24a. The inner cylinder is in position to be filled with unpopped kernels by the operation of the conveyor. When now the handle 26 is moved from the dotted line position in Fig. 7 and in which position it is shown in Fig. 6, to full-line position in Fig. 7, then the port 54 in the inner cylinder is brought into register with the opening 57 communicating with the delivery spout 24a and the contents of the inner cylinder 51 are thus emptied into the heater pot 23. At this time the port 53 in the inner cylinder is closed by being out of register with the opening 56 and thus the conveyor 22 cannot deposit any kernels in the kernel-measuring device until the inner cylinder 51 is restored into position shown in dotted lines in Fig. 7 and also shown in Fig. 6.

As best shown in Fig. 5, the inner cylinder 51 is keyed to the shaft 58 of the handle 26 and one head 59 of this inner cylinder is movable longitudinally on the shaft 58 as by the screw-threaded lock nut connection 60 so that the amount to be measured by the kernel-measuring device may be varied to suit the amount desired to be deposited in the heater pot.

Similarly, as best shown in Fig. 6 the salt-measuring device 27 is composed of inner and outer cylinders 61 and 62. The inner cylinder 61 has two angularly spaced-apart ports 63 and 64 which are adapted to register respectively with openings 65 and 66 in the outer cylinder 62, the openings 65 and 66 opening into the salt storage container 44 and the delivery spout 27a respectively. When the kernel-measuring device is in the position shown in dotted lines in Fig. 7 and as shown in Fig. 6, a pin 67 on the end of the cylinder 51 has kicked an arm 68 rigidly secured to the cylinder 61 so as to place the port 64 in communication with the opening 66 and empty the contents of the salt-measuring device into the heater pot through the delivery spout 27a. When now the handle 26 is returned to full-line position as shown in Fig. 7, another pin 69 kicks the arm 68 to rotate the cylinder 61 to close the port 64 and place the port 63 in communication with the opening 65 which refills the salt-measuring device 27 from the salt storage container 44. Thus operation of the handle 26 to deposit the kernels in the heater pot fills the salt-measuring device 27 and operation of the handle 26 to fill the kernel-measuring device for the next operation empties the salt-measuring device, thus causing deposit of the salt to follow subsequent to and on top of the kernels in the heater pot. As best shown in Fig. 4 by means of a plug end 70 and set screw 71 the capacity of the salt-measuring device 27 may be regulated to determine the amount of salt so deposited.

I will now describe the oil-measuring device and its operation. The bell crank lever 29 already referred to is connected by a rod 72 (Fig. 9) to lift a reciprocally movable inner cylinder 73 within the outer cylinder 74 of the oil-measuring device 30, this inner cylinder 73 being hollow and thus forming an oil cup, which has a port 75 adapted to be placed into and out of register with the port 76 in the outer cylinder, the port 76 opening into the delivery spout 30a.

Oil pumped as described from the tank 45 rises through the pipe 48 (Fig. 8) and into the oil cup 73 through another port 77 in this oil cup which in the position of the oil cup shown in Fig. 9 is in register with the pipe 48. Since the ports 75 and 76 are now closed the oil rises in the oil cup to the top thereof just above which there is an overflow port 78 in the outer cylinder 74 through which the overflow returns to the tank 45 by the pipes 79 and 49. When the oil cup 73 is raised by the manipulation of the handle 28, the ports 77 and 78 are closed and the port 75 is placed in register with the port 76 whereupon substantially all of the contents of the oil cup except a small residue below the port 75 will flow through the spout 30a into the heater pot. At this time, in order to permit continuous operation of the pump 46 the oil continues to flow beneath the oil cup and through the pipe 80, returning to the tank through the pipe 49. A drain pipe 81 at the bottom of the outer cylinder 74 also communicates with the pipe 49 and returns any oil received therein to the tank. It will be understood that there is one of these oil-measuring devices 30 for each of the heater pots 23 and the pipes 48 and 49 may be connected with the inlet header 82 and the return header 83 respectively. The skirt 73a of the oil cup 73 limits downward movement of the oil cup in the hollow cylinder 74, and a slot 77a in this skirt permits the oil to flow therethrough from the pipe 48 to the pipe 81 in intermediate positions of the oil cup so that rapid continuous circulation of the oil is permitted at all times and in any position of the oil cup 73.

I will finally describe the operation of the bag-measuring device. The bag-measuring device 38 is closable at the top by a gate 84 (Fig. 10) operated by a pneumatic cylinder 85 and closable at the bottom by another gate 86 operated by another pneumatic cylinder 87. It will be noted that the delivery hopper 37 is closable at its lower end by the gate 84. Below this the delivery funnel is in three sections 88, 89 and 90, the section 89 being sleeve-like and the sections 88 and 90 being telescoped within the outer section 89. The gate 86 and its pneumatic operating cylinder 87 are adjustable vertically with the funnel section 90 so as to increase or decrease the distance between the gates 84 and 86 and thus regulate the amount of popcorn to be deposited in a package or bag 39. For this purpose a pair of turnbuckle devices 91 carry these lower parts in cooperation with the vertically extensible framework 92 suitably carried by the standard 93 of the machine as a whole.

The air cylinders 85 and 87 are connected by flexible pipe sections 94 and 110 which permit the adjustment apart of these cylinders 85 and 87 as above described.

By means of an air supply pipe 96 (Fig. 11) controlled by a hand valve 97, air under pressure is constantly received in the pipe 98 up to the four-way valve 99 which is controlled by the pedal 50. When the pedal is not depressed to actuate the valve 99 by means of the chain 100 connected with the pedal and meshed with the sprocket 101, the valve member proper 102 of valve 99 is in the position shown in Fig. 14, in which the compressed air passes through the pipe 103 to the pipe 104 for the cylinder 85 and at the same time through the flexible pipe 94 to the cylinder 87, thus operating the pistons within the air cylinders 85 and 87 to move the gates 84 and 86 simultaneously into position where a circular cut-out 105 in the upper gate 84 registers with the interior of the funnel section 88 (Fig. 13) and permits popcorn to fill the measuring device 38 which is at this time closed at its lower end by the gate 86. In this position of the cylinder piston the exhaust side of the piston 85 communicates with the pipe 106 and with the pipe 107 through the valve 99 and the pipe 108 where it is blown by means of the jet 109 into the lower end of the delivery hopper 37, lightening the weight of the delivery supply of popcorn and agitating the popcorn, thus preventing jamming of the gate 84. The flexible pipe 110 similarly conveys to the pipe 107 the exhaust from the cylinder 87.

When now the operator wishes to fill a bag 39, the pedal 50 is pressed upon, and the valve member 102 of the valve 99 is rotated ninety degrees with respect to its position as shown in Fig. 14 so as to connect the inlet pipe 98 with the pipes 107, 106 and 110, which moves the cylinder pistons in the opposite direction to close the gate 84 and to open the gate 86, whereupon the contents of the measuring device 38 are deposited in the bag 39. At this time the exhaust from the cylinders passes through the pipes 94, 104 and 103 through the valve 99 to the pipe 108 and again through the jet 109 into the delivery hopper for the same purpose as before.

A helical expansion spring 111 connected to the end of the chain 100 restores the pedal 50 to initial position and at the same time the valve 99.

It is understood that the invention is not limited to details of construction shown for purposes of exemplification. Furthermore, it is not indispensable that all features of the invention be used conjointly, as various combinations and sub-combinations may be advantageously employed.

Having described my invention, I claim:

1. In a popcorn machine, the combination of a plurality of heater pots, a kernel measuring device for each pot, common means for filling the kernel measuring devices, a salt measuring device for each pot, and means for operating the individual kernel measuring devices, each of said last mentioned means automatically operating also one of the salt measuring devices to deposit a predetermined amount of kernels and salt in a pot.

2. In a popcorn machine, the combination of a plurality of heater pots, a kernel measuring device for each pot, common means for filling the kernel measuring devices, an oil measuring device for each pot, and common means for filling the oil measuring devices.

3. In a popcorn machine, the combination of a plurality of heater pots, a kernel measuring device for each pot, and common means for filling the kernel measuring devices, said means including a tubular screw conveyor.

4. In a popcorn machine, the combination of a plurality of heater pots, a kernel measuring device for each pot, common means for filling the kernel measuring devices, common means for receiving the popped kernels from said pots, and a package measuring device receiving the popped kernels from the last mentioned means.

5. In a popcorn machine, the combination of a heater pot, a kernel measuring device, means for filling the kernel measuring device, a salt-measuring device and means for operating the kernel measuring device, said last mentioned means automatically operating the salt measuring device to deposit a predetermined amount of kernels and salt in a pot, and being arranged to deposit the salt after the kernels are deposited.

6. In a popcorn machine, the combination of a plurality of heater pots, a kernel measuring device for each pot, and common means for filling the kernel measuring devices, said means including a hopper, a vertical tubular screw conveyor rising therefrom, and another horizontal tubular screw conveyor operatively connected with the first screw conveyor.

7. In a popcorn machine, the combination of a plurality of heater pots, a kernel measuring device for each pot, common means for filling the kernel measuring devices and common means for receiving the popped kernels from said pots, said last mentioned means including a trough and a wire conveyor therein, the upper run of which conveys the whole kernels in one direction and the lower run of which sweeps the duds in the opposite direction, and a package measuring device disposed to receive the kernels from said upper run.

8. In a popcorn machine, the combination of a plurality of heater pots, a kernel measuring device for each pot, common means for filling the kernel measuring devices, a salt measuring device for each pot and means for operating the individual kernel measuring devices, each of said last mentioned means automatically operating also one of the salt measuring devices to deposit a predetermined amount of kernels and salt in a pot, and being arranged to deposit the salt after the unpopped kernels are deposited.

9. In a popcorn machine, the combination of a plurality of heater pots, a kernel measuring device for each pot and common means for filling the kernel measuring devices, and an oil measuring device for each pot, and common means for filling the oil measuring devices, said last mentioned means providing for continuous circulation of the oil therethrough whether the oil measuring means are or are not operating whereby a constant temperature of the oil may be maintained.

10. The structure of claim 1 wherein the package measuring device is operated by compressed air cylinders and the exhaust from said cylinders on both closing and opening operation of the device is directed to said common means for receiving the kernels from said pots, to agitate the popcorn therein.

11. The structure of claim 2 wherein the oil circulating system includes for each pot an oil cup vertically reciprocal in a hollow cylinder and ports in said oil cup and hollow cylinders adapted to be placed into and out of registry.

12. The structure of claim 2 wherein the oil circulating system includes for each pot an oil cup vertically reciprocal in a hollow cylinder and ports in said oil cup and hollow cylinder adapted to be placed into and out of registry, and wherein the oil circulates through all of said hollow cylinders from and to a common oil supply tank in all positions of the oil cups.

13. In a popcorn machine of the class described, an oil measuring device including an oil cup vertically reciprocal in a hollow cylinder, ports in said oil cup and hollow cylinder adapted to be placed into and out of register for entry into and discharge respectively of oil from said cylinder through the intermediation of said oil cup, and means for continuously circulating oil through said cylinder from and to a supply tank in all positions of the oil cup within the cylinder.

14. In production of the class described, the combination with a plurality of heater pots, of a kernel measuring device individual to each pot and an oil measuring device individual to each pot, means for circulating a supply of kernels continuously adjacent the kernel measuring devices, and means for circulating the oil continuously adjacent the oil measuring devices, and means for discharging kernels and oil received by said measuring devices from said circulating means respectively to said pots while permitting said continuous circulation.

CLAUDE E. QUICK.